Aug. 4, 1970  F. M. JOHNSON  3,523,256
HEAT PUMPED LASER
Filed Feb. 12, 1965

INVENTOR:
FRED M. JOHNSON
ATTORNEY: WILLIAM A. KEMMEL JR.

United States Patent Office 3,523,256
Patented Aug. 4, 1970

3,523,256
HEAT PUMPED LASER
Fred M. Johnson, Monrovia, Calif., assignor, by mesne assignments, to Xerox Corporation, a corporation of New York
Filed Feb. 12, 1965, Ser. No. 432,174
Int. Cl. H01s 3/09
U.S. Cl. 331—94.5    3 Claims

ABSTRACT OF THE DISCLOSURE

This application relates to a heat pumped laser having means directly connected to a cathode for heating said cathode to a temperature sufficient to maintain operation in the low voltage arc mode and to supply sufficient power to adjacent negative absorption material to cause laser action.

---

In general, the present invention relates to a laser adapted to convert thermal energy directly to monochromatic coherent light radiation. More specifically, the present invention relates to a gas laser which is pumped by a low voltage arc mode discharge wherein the negative absorption material producing the laser action supports the discharge. The phrase "negative absorption material" as used in the present application refers to a material which is capable of achieving a non-equilibrium population distribution of its atoms among several energy levels whereby the upper of two adjacent energy levels becomes overpopulated with respect to the lower energy level. In such negative absorption material, incident light of a frequency corresponding to the energy separation of such two levels will increase in intensity (neglecting losses) as it passes through the material due to the stimulated radiation from the overpopulated upper energy level. Thus, the phrase "negative absorption material" is descriptive of the effect such material is capable of producing; however, such material may also be defined as being capable of a negative temperature or achieving population inversion as set forth in the current literature on lasers.

To date, laser devices, particularly gas laser devices, have been limited to pumping or driving means limited to optical sources or electrical energy sources. For example, a cesium vapor has been optically pumped by a helium resonance radiation source. Similarly, the rare gases have been pumped to laser action with radio frequency excitation and with DC positive column discharges, both of which use electrical power directly. One disadvantage of such prior art pumping means is their very low efficiency. For example, for RF pumping, the thermal efficiency is normally about 0.1%. Similarly, such systems are normally relatively complicated, require delicate adjustment, and frequently do not have a long operating life. Most important, such prior art systems require the use of electrical power to operate the laser device and thus are unable to utilize directly the readily available heat energy from sources such as nuclear reactors.

Consequently, an object of the present invention is a laser device which is adapted to convert thermal energy directly into monochromatic coherent light radiation.

Another object of the present invention is a laser device which is adapted to utilize the low voltage arc mode discharge to efficiently pump the laser device.

Still another object of the present invention is a laser device which is adapted to use the low voltage arc mode discharge to pump the laser device with such discharge being maintained by high temperature heat sources.

Still another object of the present invention is a laser device capable of operating with high thermal efficiency.

Still another object of the present invention is a relatively simple, rugged laser device which is adapted to have a relatively long operating life.

Other objects and advantages of the present invention will be readily apparent from the following description and drawings which illustrate a preferred exemplary embodiment of the present invention.

In general, the present invention involves a laser comprising a chamber containing a negative absorption material. Such chamber is adapted to achieve laser action with sufficient power input to said negative absorption material. In said chamber is a cathode and an anode which are adapted to operate with the negative absorption material to form a low voltage arc mode discharge and to supply power to the negative absorption material sufficient to cause laser action. The laser also includes means for heating such cathode to a temperature sufficient to maintain operation at the low voltage arc mode discharge and supply power to the negative absorption material sufficient to cause the laser action.

In order to facilitate understanding of the present invention, reference will now be made to the appended drawings of a preferred specific embodiment of the present invention. Such drawings should not be construed as limiting the invention which is properly set forth in the appended claims.

Figure 1:
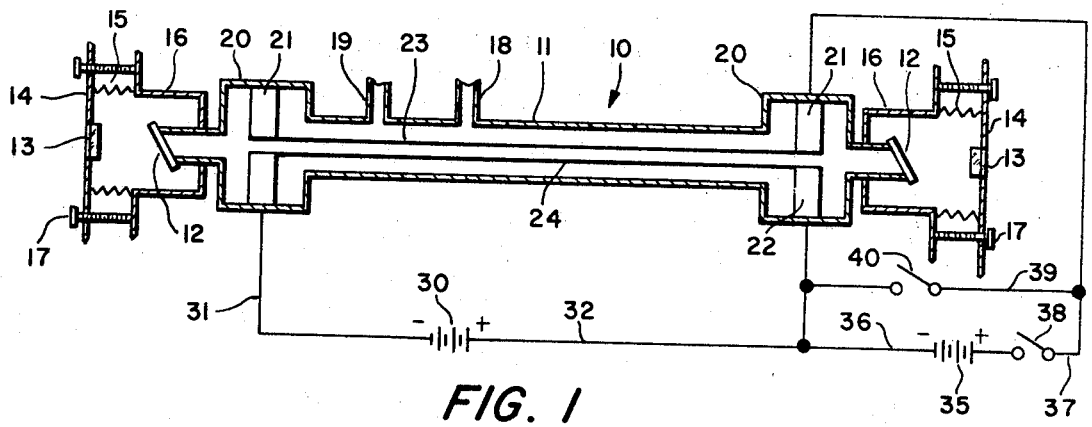
FIG. 1 is a schematic diagram of a specific embodiment of the laser device of the present invention, utilizing electrical heating means.

As illustrated in FIG. 1, the laser 10 includes a hollow, cylindrical chamber 11 about 3–4 cm. in diameter. The ends of the chamber 11 are capped with parallel sapphire windows 12 set at the Brewster angle (60°) with the axis of the chamber 11 and with a center-to-center spacing of about 120 cm. Such arrangement eliminates the reflection loss for radiation polarized in the plane of incidence and prevents oscillation in radiation polarized normal to the plane of incidence. Consequently, the resultant losses in transmission through the window may be kept very low. External to the chamber are opposed reflecting end members 13 which are circular mirrors coaxial with the chamber 11 and separated by the chamber 11. The mirrors 13 are about equally spaced from the windows 12 and are about 2–3 meters apart and have a radius of curvature of about 4 meters and a center of curvature which is within the chamber 11 on its axis. The surface of the mirrors is coated so that one is substantially 100% reflecting to incident radiation while the other is about 99% reflecting to permit the coherent radiation to leak through when sufficient intensity is obtained. The walls of the chamber 11 are preferably transparent to or absorptive of radiation impinging thereupon, i.e., are substantially non-reflective. Such construction eliminates from the chamber radiation occurring in all modes except radiation corresponding to waves which travel back and forth between the reflecting members 13. In this way, substantially only the reflected modes are reinforced in the negative absorption material and thus strongly favor laser oscillation. Specifically, the chamber 11 may be formed out of stainless steel and have a suitably absorptive coating on its inner surface. The mirrors 13 are each mounted on an adjustable plate 14 which in turn is connected by bellows 15 to a housing 16 mounted on each end of the chamber 11. Such arrangement permits the space between the window 12 and the mirror 13 to be evacuated to minimize interference with the reflected radiation. The position of the plates 14 may be suitably adjusted by screws 17. The chamber 11 also has a suitable conduit connection 18 for evacuating it and a second conduit connection 19 for admitting the desired negative absorption material to it.

Adjacent each end of the chamber 11 is an enlarged compartment 20. In each compartment 20 is an anode support 21 and an opposed cathode support 22 which are adapted to have their posititons adjusted by conventional devices not shown. Extending between the anode supports 21 is the anode 23 which may be simply a tungsten wire about 1–2 mm. in diameter. Similarly, extending between the cathode supports 22 is the cathode 24 which may be a tungsten wire or thoriated tungsten wire having a diameter of about 1–2 mm. The anode 23 and cathode 24 extend parallel to the axis of the chamber 11 and are separated thereby. The axis-to-axis spacing between the anode 23 and cathode 24 may be about 4–25 mils, and is preferably about 20 mils.

Within the chamber 11 is a negative absorption material which has at least three energy levels, two of which have a separation corresponding to a frequency which forms a resonant mode of oscillation between the reflecting members 13. In addition, the negative absorption material is adapted to form a low voltage arc mode discharge between the electrodes. Examples of such negative absorption materials include the rare gases helium, neon, krypton, xenon, and argon, and the alkali metal vapors such as cesium, potassium, sodium, and rubidium.

The laser 10 also includes means for heating the cathode 24 to a temperature sufficient to maintain operation in the low voltage arc mode and supply power to the negative absorption material sufficient to cause laser action. As illustrated in FIG. 1, the heating means comprises a power source, i.e., the battery 30, which is connected by leads 31 and 32 to the cathode supports 22 so as to cause current flow through the cathode 24. Thus, by simple resistance heating of the cathode 24, the desired operating temperature may be obtained.

Figure 3:
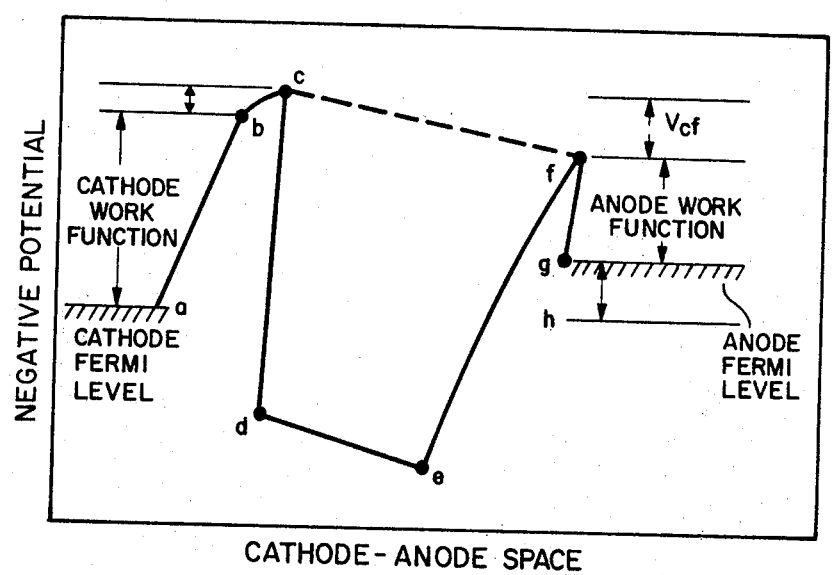
FIG. 3 is a schematic diagram illustrating the operating principles of the present invention.

The operation of the laser illustrated in FIG. 1 can best be described by reference to the diagram FIG. 3 showing the theoretical potential distribution in arc-mode discharge wherein the increasing negative potential is plotted along the ordinate and the cathode-anode space is plotted along the abscissa. As the result of heat input to the cathode 24, some of the cathode electrons have their energy increased from the Fermi level $a$ of the cathode to the top of the potential barrier $b$ which represents the cathode work function. As electrons are emitted, an additional potential barrier $b-c$ will form as a result of the space charge adjacent the cathode. Electrons with sufficient initial kinetic energy to overcome the total potential barrier $a-c$ are then accelerated into the plasma formed between electrodes by the potential drop $c-d$ in the sheath between the cathode and the plasma. Once in the plasma, the electrons cause ionization and excitation of the gaseous atoms with the excitation process producing the population inversion or negative absorption condition. Thus, as illustrated in FIG. 3, energy is lost from the electrons to the plasma as represented by the potential drop $d-e$ in FIG. 3. However, the high energy electrons in the plasma overcome the potential barrier $e-f$ between the plasma and the anode potential. Consequently, a portion of the electrons will flow from the plasma to the anode. The over-all process is illustrated by the dotted line $c-f$ which represents the flow of electron current from the cathode to the anode with the voltage drop $V_{cf}$ being the voltage drop between the cathode and anode. The electrons which enter the anode drop through the potential drop represented by the anode work function $f-g$ which converts such energy into heat. However, since the Fermi level of the anode is above the cathode Fermi level, a potential drop $g-h$ is available to drive electric current in the external circuit. Such voltage represents the normal voltage output of the thermionic converter; however, it is preferably used in the present circuit in the present invention to maintain the voltage difference between the cathode and anode.

With the foregoing operating principles in mind, the operation of the device illustrated schematically in FIG. 1 can be set forth. Initially, the chamber 11 is evacuated by suitable means through the conduit 18 and then the gas which is to be used as the negative absorption material is charged and adjusted to the predetermined pressure through the conduit 19 and the chamber then sealed. The cathode 24 is then heated to the desired operating temperature by its power source 30. Then a second power source 35 is connected by its leads 36 and 37 across the cathode 24 and anode 23 to produce an arc mode discharge. Once the arc mode discharge operation is generated, it produces an output voltage as set forth above so that the power source may be disconnected by the switch 38 and the anode 23 shorted directly to the cathode 24 by means of the circuit 39 and switch 40. During the operation of the laser device, stimulated emission of radiation occurs in the chamber 11 so that a portion of such radiation leaks out of one end through the mirrors 13 due to its reduced reflectivity.

As noted above, a variety of gases may be utilized as the negative absorption material in the present invention. In Table 1 a suitable pair of energy levels and their corresponding wavelengths are given for some of such gases in conjunction with their optimum operating pressure and the gain obtainable. The approximate operating conditions for such gases are set forth in Table 2.

Figure 2:
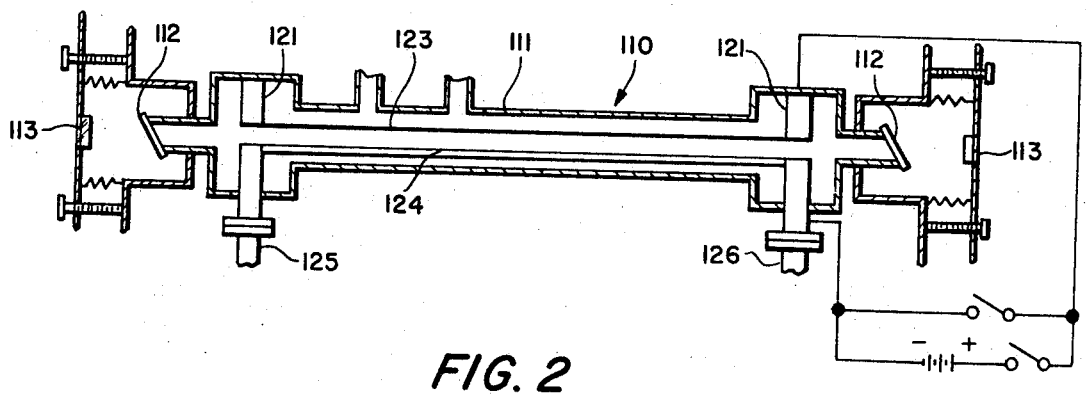
FIG. 2 is a schematic diagram of another specific embodiment of the present invention utilizing flow of a heated fluid through the cathode as a heating means.

An alternate embodiment of the present invention is illustrated schematically in FIG. 2 wherein the laser 110 has an enclosed chamber 111 with opposed reflecting end members formed by windows 112 and mirrors 113. The anode 123 is again simply a wire supported by supports 121. However, the cathode 124 is formed by a tube connected to an inlet conduit 125 and an outlet conduit 126 while being electrically insulated therefrom. A suitable high temperature medium such as fluid from a nuclear reactor is then passed through the cathode 124 to achieve the operating temperature of the device.

TABLE 1

| Gas | Energy level Transition | Coherent Wavelength (microns) | Optimum Pressure (torr) | Gain (minimum) (percent) |
|---|---|---|---|---|
| Cesium | $8S_{1/2}$—$6P_{3/2}$ | 7,944 | 1–4 | >3 |
| Do. | $8S_{1/2}$—$6P_{1/2}$ | 7,609 | 1–4 | >3 |
| Do. | $7D_{3/2}$—$6P_{3/2}$ | 6,983 | 1–4 | >4 |
| Do. | $7D_{5/2}$—$6P_{3/2}$ | 6,973 | 1–1 | >3 |
| Argon II | $4p^4D^0_{1/2}$—$4S_2P_{3/2}$ | 4,879.86 | 1–4 | >12 |

TABLE 2

| Gas | Cathode Work Function at operating temperature | Anode Work Function | Cathode Temperature ° C. | Gas Electron Temperature ° K. | Arc Drop, V. | Cathode Material |
|---|---|---|---|---|---|---|
| Cesium | 2.8 | 1.5 | 1,500 | 2,500 | 0.7 | Tungsten. |
| Do. | 2.5 | 1.5 | 1,200 | 2,500 | 0.5 | Molybdenum. |
| Argon plus trace of cesium vapor | ~3.0 | 1.7 | 1,500–2,500 | 14,000 | ~2.9 | Do. |

Many other specific embodiments of the present invention will be obvious to one skilled in the art in view of this disclosure. For example, the heating of the cathode may be achieved directly by placing the laser device adjacent to the heat source such as a nuclear reactor or by locating an intense radioactive source inside the cathode. Similarly, a variety of reflecting end members may be utilized such as plain parallel mirrors.

There are many features in the present invention which clearly show the significant advance the present invention represents over the prior art, consequently only a few of the more outstanding features will be pointed out to illustrate the unexpected and unusual results obtained by the present invention. One feature of the present invention is the direct conversion of thermal energy into monochromatic light radiation. Thus, heat from sources such as nuclear reactors may be utilized directly to produce laser radiation. Another feature of the present invention is the relatively efficient conversion of other forms of energy into laser radiation. Thus, for example, even where electrical energy is utilized to heat the cathode, a larger proportion of such electrical energy is converted into laser radiation than the prior art processes such as radio frequency pumping or DC positive column arc pumping. Still another feature of the present invention is the relative simplicity and ruggedness of the device of the present invention which would permit its use as a small unit in the field for a source of laser radiation.

It will be understood that the foregoing description and examples are only illustrative of the present invention, and it is not intended that the invention be limited thereto. All substitutions, alterations, and modifications of the present invention which come within the scope of the following claims or to which the present invention is readily susceptible without departing from the spirit and scope of this disclosure are considered part of the present invention.

What is claimed is:

1. A laser device adapted to convert thermal energy directly to monochromatic coherent light radiation comprising:
   (a) a chamber containing a negative absorption material, said chamber being adapted to have laser action achieved therein with sufficient power input to said negative absorption material;
   (b) an anode in said chamber;
   (c) a hollow cathode in said chamber; and
   (d) means for heating said hollow cathode to a temperature sufficient to maintain operation in the low voltage arc mode and to supply sufficient power to said negative absorption material sufficient to cause laser action, said means including conduit means passing through said chamber walls and connected to said hollow cathode at opposite ends thereof for passing a heated fluid therethrough, said heated fluid being of sufficient temperature to heat said hollow cathode to at least its operating temperature.

2. The device of claim 1 further including a second power source connected across said cathode and said anode for initiating an arc discharge therebetween.

3. The laser device of claim 1 wherein said conduit means is connected to a source of nuclear energy heated fluid.

References Cited

UNITED STATES PATENTS

| | | | |
|---|---|---|---|
| 3,149,290 | 9/1964 | Bennett et al. | 331—94.5 |
| 3,321,714 | 5/1967 | Tien | 331—94.5 |

JEWELL H. PEDERSEN, Primary Examiner

W. L. SIKES, Assistant Examiner